US007472025B2

(12) United States Patent
Lin

(10) Patent No.: US 7,472,025 B2
(45) Date of Patent: Dec. 30, 2008

(54) ENERGY DETECTION APPARATUS AND METHOD THEREOF

(75) Inventor: Pei-Ying Lin, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 695 days.

(21) Appl. No.: 11/220,792

(22) Filed: Sep. 6, 2005

(65) Prior Publication Data

US 2006/0253208 A1 Nov. 9, 2006

(30) Foreign Application Priority Data

Apr. 22, 2005 (TW) .............................. 94112830 A

(51) Int. Cl.
*G01L 1/00* (2006.01)

(52) U.S. Cl. ......................................... 702/44; 702/194

(58) Field of Classification Search .................. 73/597, 73/602, 863.01; 708/445, 805; 367/126, 367/127; 702/189, 194, 199

See application file for complete search history.

(56) References Cited

U.S. PATENT DOCUMENTS

| | | | | |
|---|---|---|---|---|
| 3,207,256 | A * | 9/1965 | Blizard | 367/36 |
| 5,282,014 | A * | 1/1994 | Ruhl et al. | 356/4.02 |
| 5,568,450 | A * | 10/1996 | Grande et al. | 367/131 |
| 5,633,809 | A * | 5/1997 | Wissenbach et al. | 702/45 |
| 6,101,230 | A * | 8/2000 | Chun et al. | 375/355 |
| 7,254,599 | B2 * | 8/2007 | Khieu et al. | 708/445 |
| 2008/0059550 | A1 * | 3/2008 | Ohkubo | 708/445 |

* cited by examiner

*Primary Examiner*—J M. Saint Surin
(74) *Attorney, Agent, or Firm*—J.C. Patents

(57) ABSTRACT

An energy detection apparatus and method for detecting energy is disclosed. The energy detection apparatus and method in the present invention obtains a new energy detection value by subtracting a previously sample-averaged value from a current output energy detection value and then adding an absolute sampled value. Thus, the apparatus and method of energy detection in the present invention is capable not only of saving cost due to no demand for memories but also of providing real-time detection with no time delay.

5 Claims, 5 Drawing Sheets

300

ENERGY DETECTION APPARATUS AND METHOD THEREOF

CROSS-REFERENCE TO RELATED APPLICATION

This application claims the priority benefit of Taiwan application serial no. 94112830, filed on Apr. 22, 2005. All disclosure of the Taiwan application is incorporated herein by reference.

BACKGROUND OF THE INVENTION

1. Field of the Invention

The present invention relates to an energy detection apparatus and an energy detection method. More particularly, the present invention relates to an energy detection apparatus and an energy detection method that operates with no time delay.

2. Description of the Related Art

Digital signals play an important role in the processing of multimedia data. One of the applications of digital signals is in the transmission of one-dimensional digital sound information. The integration of audio and digital signal processing is indispensable for telecommunication.

In audio data signaling, a large quantity of data is continuously transmitted and it may include considerably incorrect noise signals and interferences. To capture correct signals, the signals must be checked to determine if they are correct or not. Conventionally, the process of determining whether a signal should be captured includes detecting the strength of the signal energy. Briefly, when the energy level detected at a definite time point is higher than a preset energy threshold, the signal at the next time point can be captured and used. On the contrary, if the energy level is lower than the threshold value, the signal at the next time point is regarded as a noise signal so that capturing is stopped. Typically, the energy detection involves sampling the initial input signal to obtain an input analogue signal. After the processes of dispersing and converting the analogue signal into digital signal, a number of samples are used for finding an average energy value for a definite time interval. This average energy value is served as the basis for recognizing the energy level for the energy detection. In the following, the conventional energy detection method is briefly discussed.

FIGS. 1A, 1B and 1C schematically show an input signal sampling diagram, an output waveform diagram of energy detection result, and an output diagram of the signaling sample captured and processed according to the energy detection result. FIG. 1A is an input signal sampling diagram. As shown in FIG. 1A, a number of input signals is sampled in sequence and converted into absolute values. In a common energy detection method, to be effective in estimating, computing and detecting the energy values, a detection window is often defined. The detection window serves as a standard in the computation for determining the energy values, that is, defining the length of sampling period and the number of samples as a base for energy detection. For example, as shown in FIG. 1A, the detection window has a time length of 8 samples. In FIG. 1A, the sampling for the $n^{th}$ time block and the $(n+1)^{th}$ time block according to the aforementioned detection window size is sketched.

FIG. 1B shows the output waveform of the energy detection result. To carry out the energy detection, the sampled input signal data for a time block is registered and stored in a memory. After using the data to compute the energy values, whether to process or capture and output the sampled data stored in the memory is determined according to the computed energy values. FIG. 1C shows the output diagram of capturing the signal samples according to the energy detection result. From FIGS. 1A through 1C, it can be easily seen that the sampling operation is still progressing sequentially during the $n^{th}$ time block (see the $n^{th}$ time block in FIG. 1A). However, the output of the energy detection result and the sample output according to the energy detection result are the values obtained in the $(n-1)^{th}$ time block. In other words, the energy detection in any time block is based on the values obtained from the previous time block stored in the memory. It means the current energy detection has to depend on the previously collected samples. Since there is a time delay in the energy detection, a real-time detection of the energy values is impossible and cost of memories for registering and storing data is required. Thus, the major defects of this type of energy detection method are time delay in energy detection and additional cost of memories.

FIGS. 2A, 2B and 2C schematically show an input signal sampling diagram, an output waveform diagram of energy detection result and an output diagram of the signaling samples captured and processed according to the energy detection result, for another method of energy detection in the prior art. FIG. 2A is an input signal sampling diagram similar to the one in FIG. 1A. As shown in FIG. 2A, a number of input signals is sampled in sequence and converted into absolute values.

FIG. 2B shows the output waveform of the energy detection result. The method is slightly different from the previous one because the input signal sampled data is not stored in the memory. Instead, a hardware having a capability similar to a digital signal-processing program is used to perform the accumulation and computation for obtaining the energy value of the previous time block. According to the obtained energy value, whether to process or capture the currently sampled data is determined. As shown in FIGS. 2A through 2C, although the hardware can immediately output the values obtained from the sampled data, that is, it can immediately output the value after the value of the $n^{th}$ time block has been input (the output diagram in FIG. 1C), the energy detection result of the $(n-1)^{th}$ time block is still used. Therefore, there is still a time delay between the energy detection result and the sampled data output in this energy detection method.

Accordingly, the conventional energy detection methods not only require additional memory cost for registering and storing the input data, but also fail to dynamically compute and output the energy values in real time that causes a time delay. In other words, these methods can hardly meet the demands for rapid and accurate energy value detection.

In view of this, the present invention provides an energy detection apparatus and a method thereof which not only eliminates the additional memory cost and the time delay but also provides a real-time dynamic energy detection.

SUMMARY OF THE INVENTION

Accordingly, at least one objective of the present invention is to provide an energy detection apparatus that can be used for carrying out energy detection computation without requirement of extra memories as in a conventional energy detection apparatus. Thus, the cost is reduced and energy detection with no time delay can be achieved.

At least a second objective of the present invention is to provide an energy detection method that obtains a new energy detection value by subtracting a previously sample-averaged value from a current output energy detection value and then adding an absolute sample value. Thus, the energy detection method is able to resolve the problem of having to use the previous old value that results in a time delay in the conventional method of energy detection.

At least a third objective of the present invention is to provide an energy detection method that obtains the energy detection value of the next period of the clock signal with a period $T_1$ by subtracting a previous sample-averaged value from a current output energy detection value and then adding an absolute sample value. In addition, one another clock signal with a period $T_2$ is used to compute the sample-averaged value. Thus, the energy detection apparatus and method is able to resolve the problem of having a time delay in the conventional energy detection method and the computation of the sample-averaged value obtained is more representative.

To achieve these and other advantages and in accordance with the purpose of the invention, as embodied and broadly described herein, the invention provides an energy detection apparatus. The energy detection apparatus comprises an absolute value extractor, a first adder, a first flip-flop, a second adder and an algorithmic unit. The absolute value extractor receives a plurality of sampled values in sequence and outputs respective absolute values by extracting their absolute values. The first adder is coupled to the absolute value extractor for adding a first computational intermediate value to the output of the absolute value extractor. The first flip-flop is coupled to the first adder. According to a first clock signal, the first adder produces an output to obtain an energy detection value, where the period of the first clock signal is $T_1$. The second adder is coupled to the first flip-flop and the first adder. The second adder subtracts a sample-averaged value from the energy detection value to output a first computational intermediate value. The algorithmic unit is coupled to the absolute value extractor and the second adder. According to a second clock signal, an average value of all the outputs from the absolute value extractor within each period of the second clock signal is computed to output the aforementioned sample-averaged value. Here, the period of the second clock signal is $T_2$, and $T_2=T_1*k$ where k is a natural number.

The present invention also provides an energy detection method. First, according to a clock signal, a sampled value P(t) is input in sequence. The period of the clock signal is T. After extracting the absolute value of the input sampled value P(t), an absolute sampled value |P(t)| is output. Then, after computing the summation value of all the absolute sampled values within the time period from t−k*T to t-T, Sum (|P(t−i*T)|, and dividing the summation value by k, a previous sample-averaged value is output. Here, k is a natural number and i is a value ranging from 1 to k. Lastly, after subtracting the aforementioned previous sample-averaged value from an energy detection value and then adding the absolute sampled value |P(t)|, the energy detection value of the next period of the clock signal is obtained.

The present invention further provides an energy detection method. First, a plurality of sampled values is sequentially read. After converting the sampled values into absolute sampled values, the absolute sampled values are output. According to a first clock signal, the energy detection value in the next period of the first clock signal is obtained by subtracting a sample-averaged value from an energy detection value and then adding the current absolute sampled value. The period of the first clock signal is $T_1$. Meanwhile, according to a second clock signal, after computing the summation value of all the absolute sampled values in the previous period of the current second clock signal and finding an average, the aforementioned sample-averaged value is output. The period of the second clock signal is $T_2$, where $T_2=T_1*k$ and k is a natural number.

In brief, the energy detection apparatus and method in the present invention obtains a new energy detection value by subtracting a previous sample-averaged value from an output energy detection value and then adding an absolute sampled value. Thus, the apparatus and method of energy detection in the present invention is capable not only of saving cost due to no demand for memories, but also of providing a real time dynamic energy detection with no time delay.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
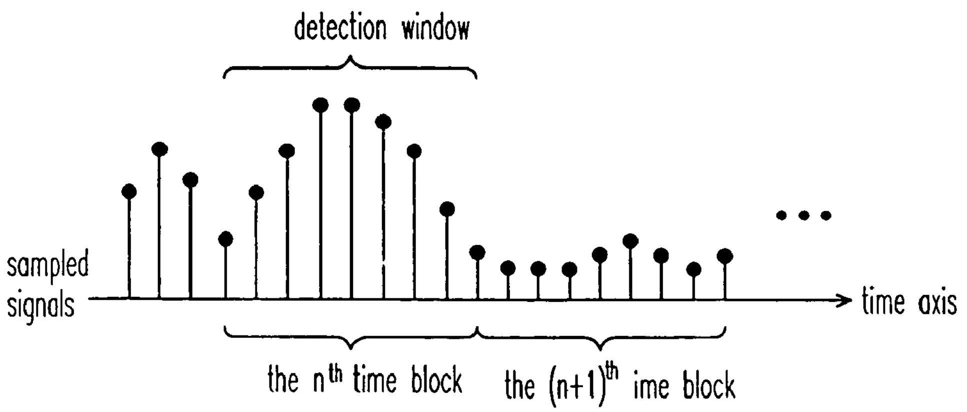
FIG. 1A (PRIOR ART)
FIG. 1A is an input signal sampling diagram in a conventional energy detection method.
Figure 1B:
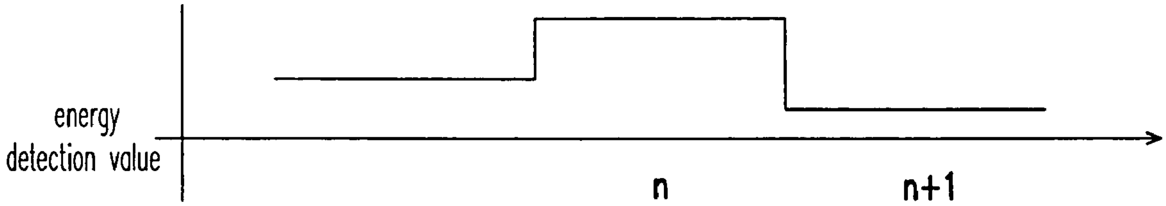
FIG. 1B (PRIOR ART)
FIG. 1B is an output waveform diagram of the energy detection result of a conventional energy detection method.
Figure 1C:
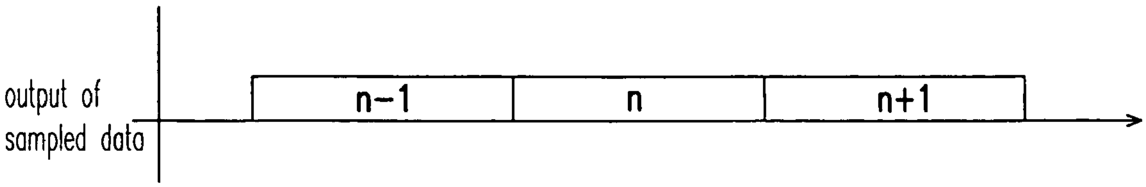
FIG. 1C (PRIOR ART)
FIG. 1C is an output diagram of captured or processed signal samples according to the energy detection result obtained from a conventional energy detection method.
Figure 2A:
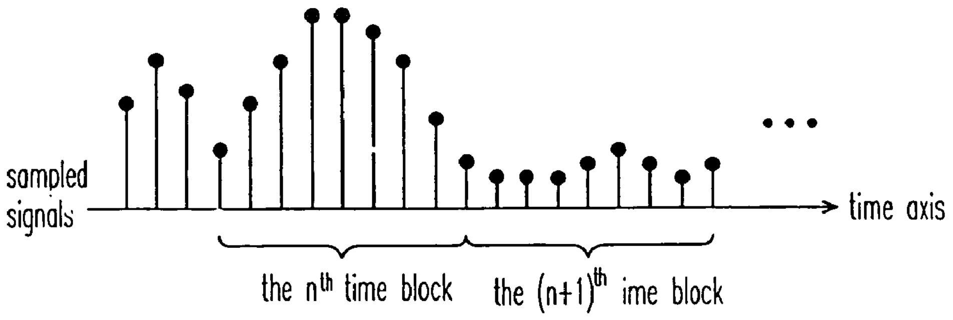
FIG. 2A (PRIOR ART)
FIG. 2A is an input signal sampling diagram in another conventional energy detection method.
Figure 2B:
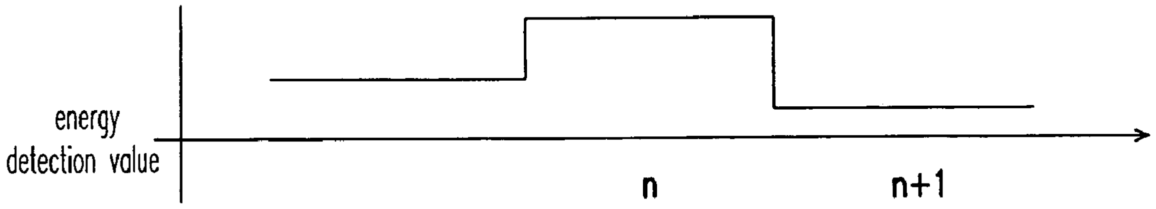
FIG. 2B (PRIOR ART)
FIG. 2B is an output waveform diagram of the energy detection result of another conventional energy detection method.
Figure 2C:
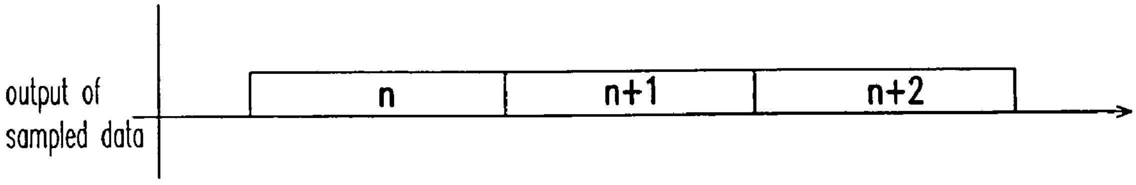
FIG. 2C (PRIOR ART)
FIG. 2C is an output diagram of captured or processed signal samples according to the energy detection result obtained from another conventional energy detection method.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
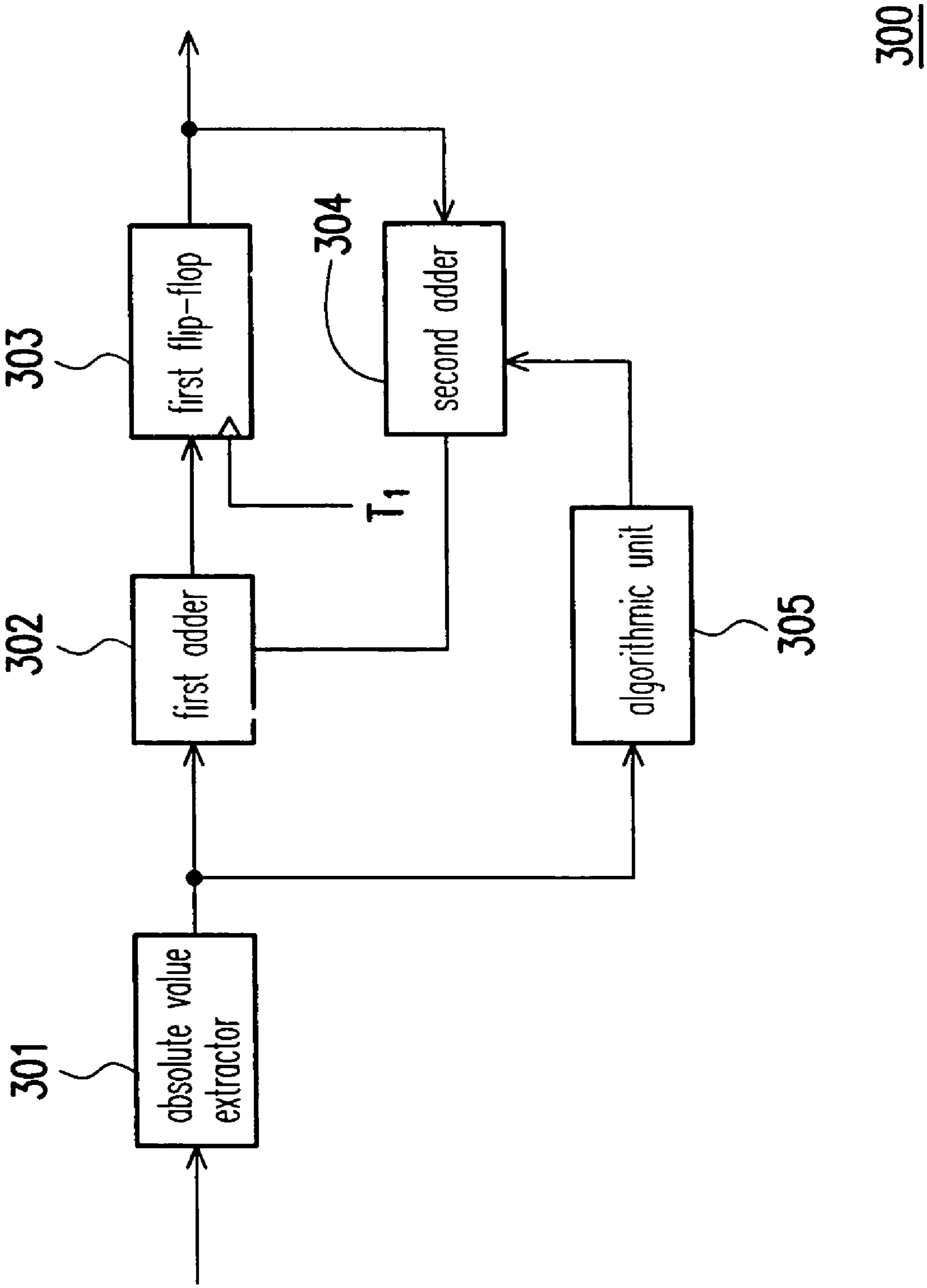
FIGS. 3A and 3B are block circuit diagrams showing the components of an energy detection apparatus according to one embodiment of the present invention.
Figure 3B:
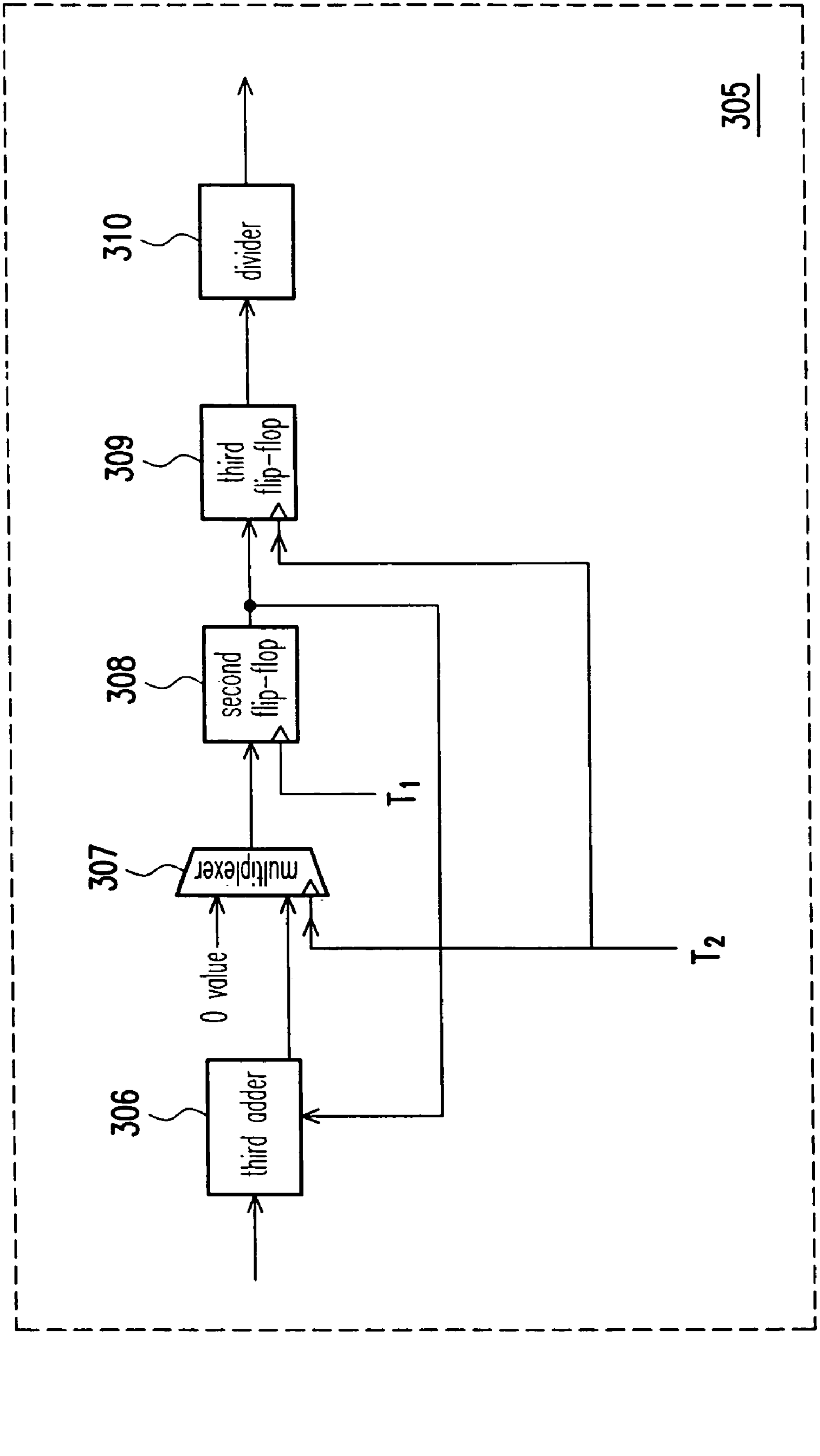

FIGS. 3A and 3B are block circuit diagrams schematically showing an energy detection apparatus and an algorithmic unit within the energy detection apparatus according to one embodiment of the present invention, respectively. As shown in FIG. 3A, the energy detection apparatus 300 comprises an absolute value extractor 301, a first adder 302, a first flip flop 303, a second adder 304 and an algorithmic unit 305.

First, the absolute value extractor 301 of the energy detection apparatus 300 receives a plurality of sampled values in sequence and converts the sampled values to obtain the absolute sampled values. Later, the absolute sampled values are output to the first adder 302 which is electrically connected with the absolute value extractor 301. The first adder 302 receives the absolute sampled values and adds the output from the second adder 304. The output from the second adder 304 is obtained by subtracting the computed output value of the algorithmic unit 305 from the output of the first flip-flop 303. The first adder 302 outputs the summation result to the first flip-flop 303. Lastly, the first flip-flop 303 outputs the output from the first adder 302 according to a clock signal with a period $T_1$. The output value is the energy detection value of the energy detection apparatus 300.

The second adder 304 therein subtracts the sample-averaged value computed by the algorithmic unit 305 from the previously output energy detection value of the first flip-flop 303, and then the value obtained is fed back to the first adder 302. The value fed back to the first adder 302 has already had the previous sample-averaged value subtracted from the current energy detection value output of the apparatus 300. This value is sent to the first adder 302 and added to the subsequently input absolute sampled value. Hence, the energy detection value for the next period of the energy detection apparatus 300 is provided. Therefore, the energy detection value output from the apparatus 300 not only accounts for the new absolute sampled value and the energy detection value output currently, but also puts into consideration of the previous sample-averaged value. As a result, the energy detection apparatus can operate without any time delay and output the new energy detection value of the next period in real time.

In the following, the algorithmic unit 305 for computing the sample-averaged value in the embodiment of the present invention is described in more detail. FIG. 3B is a block circuit diagram of the algorithmic unit inside the energy detection apparatus shown in FIG. 3A. The algorithmic unit 305 comprises a third adder 306, a multiplexer 307, a second flip-flop 308, a third flip-flop 309 and a divider 310.

As shown in FIG. 3B, the algorithmic unit 305 utilizes the third adder 306 electrically connected with the absolute value extractor 301 (as shown in FIG. 3A) to receive a plurality of absolute sampled values in sequence. Then, the third adder 306 outputs the absolute sampled values to the multiplexer 307 electrically connected with the third adder 306. According to a clock signal with a period $T_2$, the multiplexer 307 outputs either the absolute sampled value of the third adder 306 or a '0' value, which serves to reset the value and starts computing the value in the next period at the end of the period $T_2$. Then, the multiplexer 307 is connected to the second flip-flop 308, where $T_2=T_1*k$ and k is a natural number.

Within the period $T_2$ of a clock signal, the second flip-flop 308 sends the value at its input terminal to the third adder 306 after triggering of clock signal for each period $T_1$. The third adder 306 adds the new absolute sampled value to the value submitted by the second adder 308. After the summation operation, the value is sent to the second flip-flop 308 via the multiplexer 307. Thus, the values are sequentially accumulated inside the second flip-flop 308. At the end of the period $T_2$, the second flip-flop 308 outputs an accumulated value to the third flip-flop 309 for temporary storage. In the meantime, the multiplexer 307 takes in the '0' value (a reset value).

Next, the accumulated value mentioned above is output by the third flip-flop 309 electrically connected with the second flip-flop 308 to the divider 310. And the divider 310 performs the dividing of the accumulated value where division value k is a natural number for instance. It should be noted that the third flip-flop 309 is also controlled by the clock signal with a period $T_2$.

In one embodiment of the present invention, the divider 310 can be a shift register such as a 6-bit shift register for providing a division value 64.

Lastly, the algorithmic unit 305 outputs the value obtained by dividing the accumulated value through the divider 310, and this value is the sample-averaged value for supplying the second adder 304 in FIG. 3A.

Figure 4:
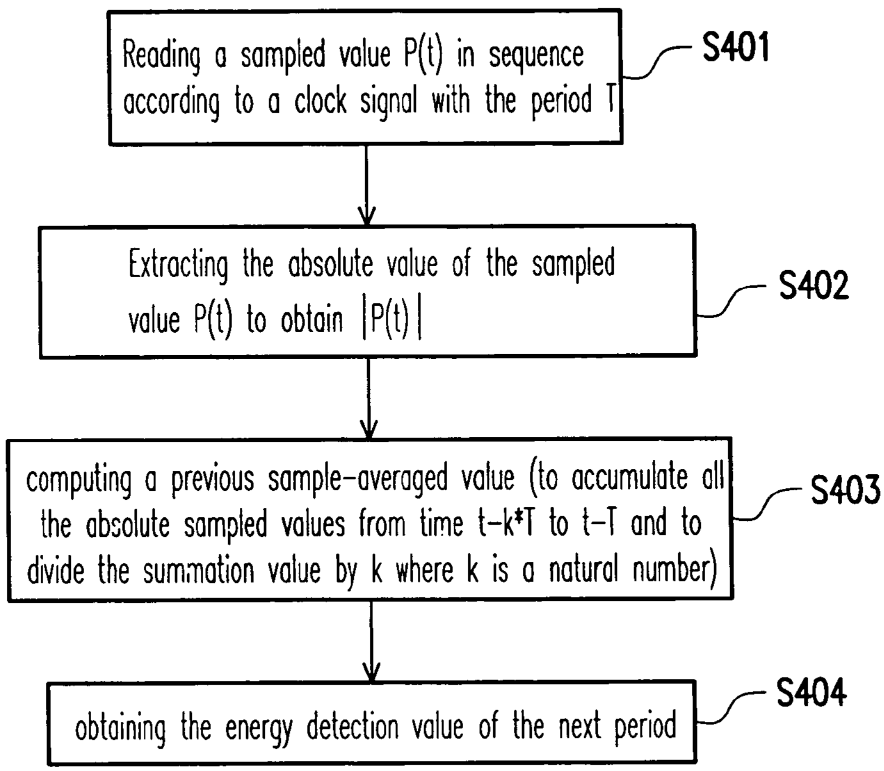
FIG. 4 is a flow diagram showing one energy detection method according to the present invention.

FIG. 4 is a flow diagram showing one energy detection method according to the present invention. As shown in FIG. 4, a sampled value P(t) is sequentially read according a clock signal with the period T in step S401. Then, the absolute value of the sampled value P(t) is extracted to produce an absolute sampled value |P(t)| in step S402. In step S403, a computation for obtaining a previous sample-averaged value is carried out. The computation includes accumulating all the absolute sampled values within the time period from t−k*T to t−T to produce a summation value, Sum (|P(t−i*T)|, and then dividing the summation value by k to produce the previous sample-averaged value required. Here, k is a natural number and i is a value ranging from 1 to k. Lastly, in step S404, after subtracting the previous sample-averaged value obtained in step S403 from an energy detection value and then adding the absolute sampled value |P(t)|, the energy detection value of the next period of the clock signal is obtained.

Figure 5:
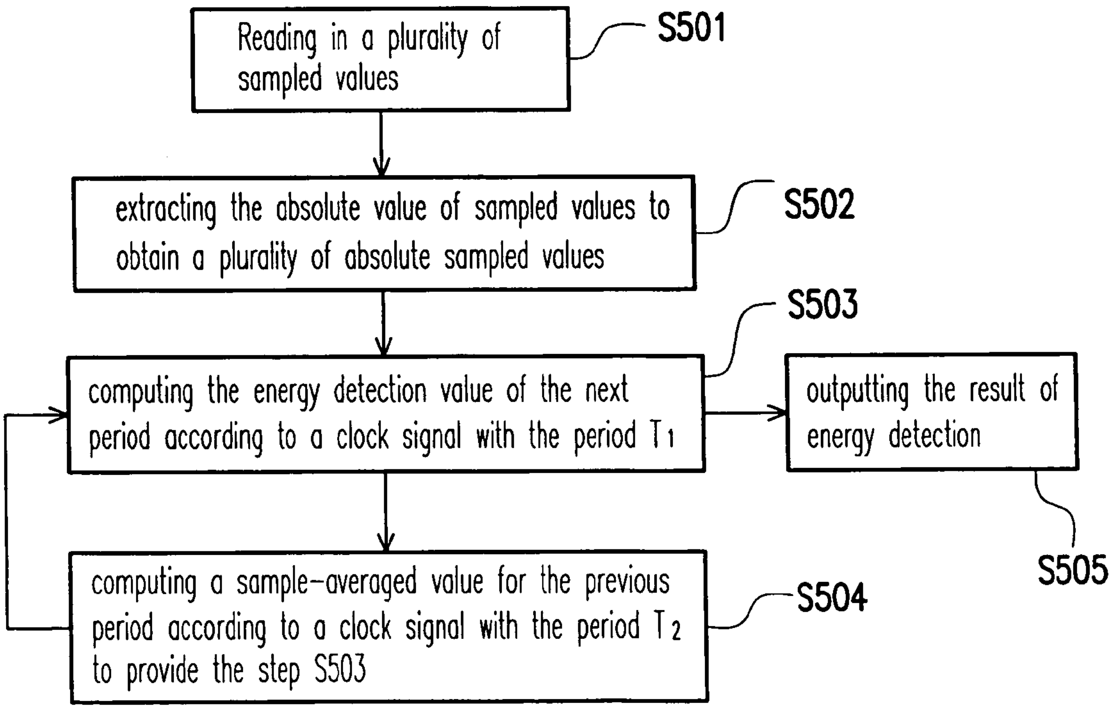
FIG. 5 is a flow diagram showing another energy detection method according to the present invention.

FIG. 5 is a flow diagram showing another energy detection method according to the present invention. As shown in FIG. 5, a plurality of sampled values is sequentially read in step S501. After converting the sampled values into absolute values, the absolute sampled values are output in step S502. Later, according to a clock signal of a period $T_1$, the energy detection value of the next period is computed in step S503. The computation includes subtracting a sample-averaged value from an energy detection value and then adding the current absolute sampled value to obtain the energy detection value of the next period of the clock signal with a period $T_1$.

On the one hand, the energy detection value of the next period computed in step S503 will be output for computation in step S504; on the other hand, the values are output to step S505 to complete the result of the energy detection method according to the present invention. In step S504, according to the clock signal with the period $T_2$, after computing the summation of all the absolute sampled values in the previous period of the current clock signal and finding a sample-averaged average. This sample-averaged value is output as the step S503 mentioned above. It should be noted that $T_2=T_1*k$ and k is a natural number in the energy detection method of the present invention.

In summary, the energy detection apparatus and method of the present invention provide a means of computing energy detection value without any need for additional memory. Thus, the cost is reduced and the energy detection can be carried out without any time delay.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An energy detection apparatus, comprising:

an absolute value extractor for receiving a plurality of sampled values in sequence and outputting the absolute values after taking the absolute values of the sampled values;

a first adder coupled to the absolute value extractor for adding a first computational intermediate value to the output of the absolute value extractor and outputting the value;

a first flip-flop coupled to the first adder for outputting the output from the first adder according to a first clock signal to obtain an energy detection value, wherein the period of the first clock signal is $T_1$;

a second adder coupled to the first flip-flop and the first adder for subtracting a sample-averaged value from the energy detection value and outputting the first computational intermediate value; and an algorithmic unit coupled to the absolute value extractor and the second adder for computing an average value of all the outputs from the absolute value extractor within any period of a second clock signal to obtain the sample-averaged value; wherein the period of the second clock signal is $T_2$, and $T_2=T_1*k$ where k is a natural number.

2. The energy detection apparatus of claim 1, wherein the algorithmic unit comprising:

a third adder coupled to the absolute value extractor for adding a second intermediate computational value to the output of the absolute value extractor, and outputting the value;

a multiplexer coupled to the third adder for outputting either the output from the third adder or a value '0' according to the second clock signal;

a second flip-flop coupled to the multiplexer for outputting the output of the multiplexer according to the first clock signal to obtain a third intermediate computational value;

a third flip-flop coupled to the second flip-flop for outputting the third intermediate computational value according to the second clock signal to obtain a summation value; and a divider coupled to the third flip-flop for dividing the summation value by k and outputting the sample-averaged value.

3. The energy detection apparatus of claim 1, wherein the divider inside the algorithmic unit is a shift register.

4. An energy detection method, comprising steps of:

inputting a sampled value P(t) in sequence according to a clock signal, wherein the period of the clock signal is T;

outputting an absolute sampled value |P(t)| after taking the absolute value of the sampled value P(t);

accumulating all the absolute sampled values from time t−k*T to t−T to produce a summation value, Sum(|P(t−i*t)|), and after dividing the summation value by k, outputting a previous sample-averaged value, wherein k is a natural number and i is a value ranging from 1 to k; and subtracting the previous sample-averaged value from an energy detection value and adding the absolute sampled value |P(t)| to obtain the energy detection value of the next period of the clock signal.

5. An energy detection method, comprising steps of:

reading a plurality of sampled values in sequence and outputting a plurality of absolute sampled values after taking the absolute values of the sampled values;

subtracting a sample-averaged value from an energy detection value and then adding the current absolute sampled value according to a first clock signal to obtain the energy detection value of the next period of the first clock signal, wherein the period of the first clock signal is $T_1$; and accumulating all the absolute sampled values within the previous period of the second clock signal according to a second clock signal to obtain a summation value and then averaging the summation value to output the sample-averaged value, wherein the period of the second clock signal is $T_2$, and $T_2=T_1*k$ where k is a natural number.

* * * * *